United States Patent Office 3,476,466
Patented Nov. 4, 1969

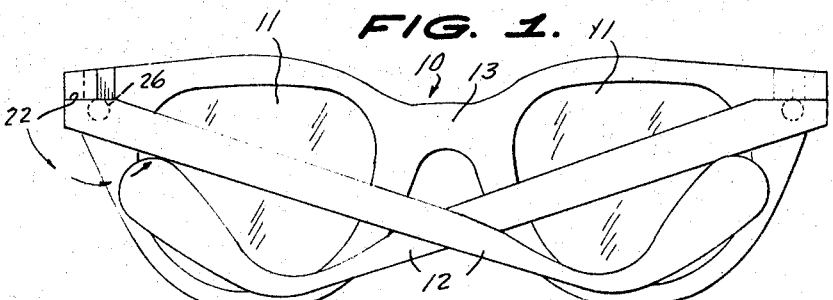
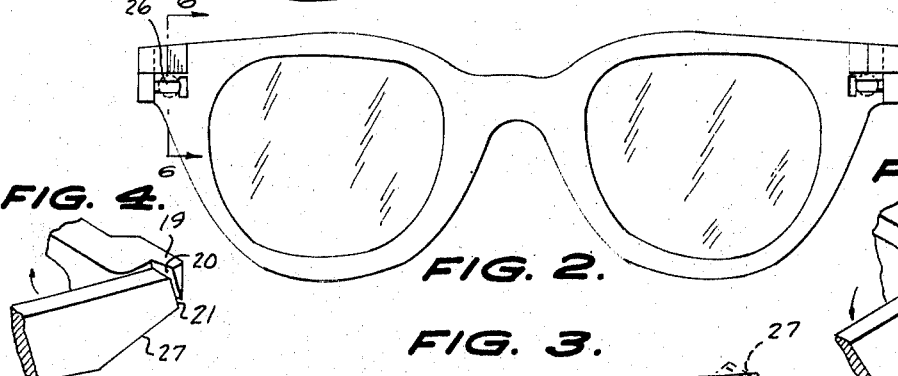
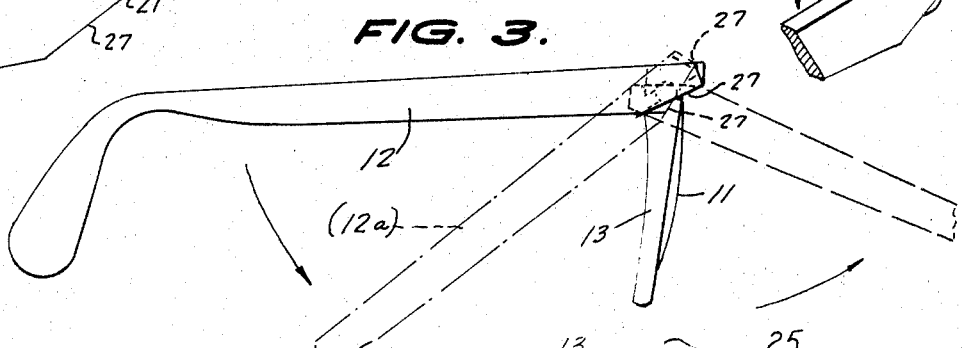
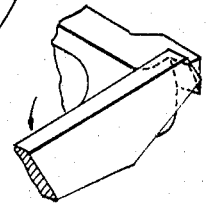
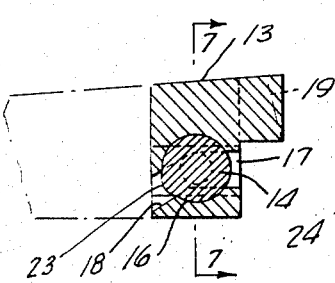
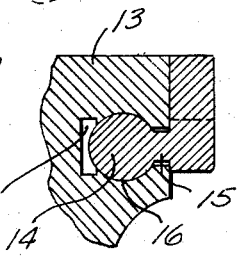
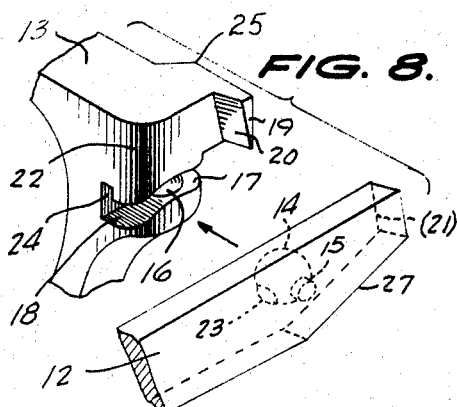
INVENTOR.
ROGER B. HOPKINS,
BY
Berman, Davidson & Berman
ATTORNEYS.

3,476,466
FORWARDLY FOLDING EYEGLASS TEMPLES HAVING BALL AND SOCKET HINGES
Roger B. Hopkins, 1411 Jackson Ave.,
Pascagoula, Miss. 39567
Filed July 29, 1966, Ser. No. 568,836
Int. Cl. G02c 5/20
U.S. Cl. 351—115                    7 Claims

ABSTRACT OF THE DISCLOSURE

Eyeglass hinges include slotted sockets on the frame ends in which a ball on a stem attached to each temple is located. A protuberance on each ball coacts with the walls of the slots to resiliently hold the temples in wearing position or folded across the front of the frame. The frame ends are provided with projecting lugs which abut the hinged ends of the temples when in wearing or folded position.

This invention relates to eyeglass frames and more particularly to eyeglass frames having temples hinged to the lens-carrying part or lens frame.

The usual eyeglass frames having temples allow the temples to be folded across the rear or concave side of the lenses, but afford no protection to the front side of the lenses, with the result that when the frames are laid down with the front side of the lenses downward, the lenses are apt to be scratched and sometimes broken.

A principal object of this invention is to provide an eyeglass frame having temples which may be folded across the outer or concave side of the lenses and whereby the lenses are protected from being scratched or broken when laid face down on a desk, table, or other place.

Another object of this invention is to provide an eyeglass frame having temples swivelled thereto and in which the temples are held very steady on the frame when the temples are in wearing position.

Another object of this invention is to provide an eyeglass frame having temples foldable across the front faces of the lenses carried on the frame and provided with means whereby the temples become releasably-locked when in said folded position and when in the wearing position.

Another object of this invention is to provide a steady and durable connection between a temple and an eyeglass frame and which permits the easy and convenient placement of the temple into wearing position and into folded position across the front of the lenses.

Another object of this invention is to provide a temple mounting which comprises few parts, is simple and durable in construction, and effectively carries the temple in a manner which renders placement of the temple into the various positions convenient and easy.

Other objects of this invention will be in part obvious and in part pointed out hereinafter.

In accordance with this invention the end of the temple near the front carries a ball having a stem extending from the ball to the temple, the ball seating in a corresponding socket in the lens piece of the frame permitting the ball to rotate on a horizontal axis and the temple to be swung from rearwardly-extending wearing position to a corresponding position extending forwardly of the frame and vice versa. Slots in the frame ends extend from the socket and open at the front and rear faces and end face of the frame ends. The forward slot permits the stem of the ball to slide therein so that the ball may be rotated on a vertical axis. This permits the temple to be pivoted from its forwardly-extending position to a position across the front of the lenses on the lens frame and vice versa. Means are provided which releasably-lock the temple in either the wearing or the folded position.

In order that a clear understanding of this invention may be had, attention is hereby directed to the accompanying drawing forming a part of this application and illustrating certain possible embodiments of this invention, and in which:

FIG. 1 is a front view of an eyeglass frame embodying this invention and showing the temples folded over the front of the lenses in the frame;

FIG. 2 is a view similar to FIG. 1, but with the temples moved to the rear of the frame;

FIG. 3 is an end view of the frame with a temple in wearing position and showing in dash lines the temple in position extending forwardly of the lens frame and ready to be folded against the front face thereof, and also showing in dash lines the temple swung into an intermediate position;

FIG. 4 is a fragmentary perspective view, partly in section, showing the end of a temple in one position of adjustment relatively to the eye-piece;

FIG. 5 is a view similar to FIG. 4, but showing the end of the temple in another position of adjustment;

FIG. 6 is a cross-sectional view of the temple-mounting construction, and is taken on the line 6—6 of FIG. 2;

FIG. 7 is a sectional view of the same and is taken on the line 7—7 of FIG. 6; and FIG. 8 is a perspective view partly in section, of an upper side edge fragment of the lens frame and the outer end of the temple at that side, these parts being shown separated from each other.

Similar reference characters refer to similar parts throughout the several views of the drawing.

Referring to the drawing, the eyeglasses have a suitable frame, generally indicated at 10, carrying a pair of lenses 11 and temples 12 swivelled at their ends on the frame for positioning thereon not only in normal wearing position, as shown in FIG. 3, but also in protective position extending across the front of the lenses, as shown in FIG. 1. This is made possible by the manner in which the temples are swivelled on the frame end piece 13.

A ball 14 having a stem 15 is secured to each temple 12 at its end adjacent the frame. Each ball 14 is swivelled in a socket 16 provided in the frame 10. A slot 17 extends forwardly from each socket and opens at the front face of the end piece 13 and another slot 18 extends rearwardly from each socket and opens at the rear face of the end piece. Both slots are also open at the ends of the end piece 13. When the ball 14 is seated in the socket 16 the stem 15 of ball 14 extends through these slots to the temple. The stem 15 is adapted to slide in the slots as the temple is rotated rearwardly or forwardly of the end piece 13 of the frame.

From each lateral side of the end piece 13 at its front upper corner is a sidewise protecting locking lug 19 having its rear surface 20 tapering downwardly and forwardly. The front end of the adjacent tempel has a matching tapered surface 21, which, when the temples are in wearing position, mates against the locking lug surface 20 and the movement of the temple upwardly, downwardly and outwardly is prevented thereby. However, the ball-and-socket connection between the temple 12 and end piece 13 and the slot 18 permits movement of the temple inwardly of the end piece a certain extent to disengage the end of the temple laterally from the locking lug 19 and to free the temple for vertical movement relatively to the end piece. The inner end edges of the frame are curved, as at 22, to permit this inward movement of the temples.

The ball 14 has a cam-like protuberance 23 on its surface which, when the temples are in wearing position, seats in the slot 18 in the frame 10 and serves as a detent or lock holding the temple in wearing position. When the temple is rotated vertically to position in which the temple extends forwardly of the frame the ball is rotated to place the protuberance 23 of the ball 14 in the slot 17 of the frame. The upper and lower surfaces of the slots are resiliently-related to permit rotation of the protuberance 23 from one slot to the other and to resiliently-restrain rotation of the protuberance 23 of ball 14 and the temple attached to the ball. Slot 18 is wider than slot 17 to increase the detent effect when the temple 12 is in wearing position.

After the temple has been swung into forwardly-extending position the temple can be swung into position extending across the front of the lenses 11 carried by the lens frame 10. This movement rotates ball 14 on a vertical axis and places the protuberance 23 of ball 14 in an inward side slot 24 provided alongside the slot 17 in the frame. The protuberance 23 has clearance in the slot 24 and thus, the temple is resiliently-locked in folded position.

Since the top of the ear is below the top of the end piece 13 when the glasses are worn, the temples are not perpendicular to the lens frame. The angle between the two is approximately 75° subject to slight adjustment either way by an optician to fit the individual, and is present when the temples extend forwardly of the lens frame, as well as when the temples extend rearwardly in wearing position. Thus, the angle of vertical swing of the temples is 150°. In order that this amount of swing will move the ball protuberance 23 from slot 17 to slot 18, or vice versa, the slot 18 is angled downwardly from slot 17, the slots making an angle with each other of 150°. This degree of swing of the temple and angle of the slots are not critical and may be varied to suit particular situations.

As stated, when the temples 12 are in wearing position the tapered end surfaces 21 mate with and abut the tapered inner surfaces 20 of the projections 19 of the end-pieces 13 and thereby the temples 12 are locked in wearing position against upward, downward or outward movement sidewise relatively to the lens frame 10. At the same time, the protuberance 23 on the ball 14 is seated in the end-piece slot 18 and serves as a detent also locking the temple 12 against movement upwardly, downwardly or outwardly sidewise relatively to the lens frame 10. Thus, the temple is doubly locked in wearing position and in a very firm and stable manner.

To move the temples 12 from wearing position to protective position across the outer or concave surface of the lenses 11, the rear ends of the temples are swung inwardly a distance sufficient to pivot the end surfaces 21 of the temples 12 sidewise out of contact with the surfaces 20 of the projecting lugs 19 on the lens-piece. Being freed from the lugs 19, the temples are then swung downwardly counterclockwise, as pictured in FIG. 3, through an intermediate position indicated at 12a and then up the front side of the lens frame until the detent protuberance on the ball 14 has become seated in the slot 17 of the end piece 13. Then the temples are swung laterally inwardly of the end piece 13 until they assume protective position across the front faces of the lenses. This latter movement of the temples 12 rotates the balls about a vertical axis and places the detent protuberances 23 of the ball 14 in the slot 24 of the end piece 13, thus releasably-locking the temples in their folded positions due to the fact that removing the protuberances 23 from the slot 24 entails the spreading apart to some extent the parts of the end piece 13 which provide the upper and lower surfaces of the end piece slots 17 and 18.

To further lock the temples when in folded position against downward and upward movement the end piece at each end is formed with a forwardly-offset portion 25 from which the locking lugs 19 extend sidewise, and having a flat under surface 26, and the temples 12 at their ends having a slanting surface 27 which, when the temples are folded, abuts upwardly against the under surface of the offset portion 25.

From the above it is apparent that the temples may be moved easily and conveniently from wearing position to protective folded position and vice versa, and that the temples become locked in either of these positions. The temples are held with great stability and steadiness in wearing position. When the temples are folded over the lenses the eyeglasses may be laid down safely with either side down; the temples protecting the front side or convex side of the lenses and the nose piece protecting the back or concave side of the lenses. The frames fold as flat as conventional frames and may easily be slipped into the pocket. The frames offer a maximum amount of protection without a case.

What is claimed is:

1. Eyeglasses comprising a lens frame with temples mounted at each end of the lens frame; each of said temples having, at the frame end a ball mounted on a stem secured to the inward side of the temple; said lens frame having at each of its ends a socket to receive the ball of the adjacent temple; each of said balls having a protuberance, and said lens frame having, at each end, slots extending forwardly, rearwardly and to the inward side of said socket, the walls of said rearward slots coacting with said protuberances to hold said temples resiliently in wearing position and the walls of said inward side slots coacting with said protuberances to hold said temples resiliently in position when folded into protective position over the front of said lens frame.

2. Eyeglasses as set forth in claim 1, and in which the lens frame at each end has a forwardly-offset portion and each temple has a sloping surface which when the temples are in folded position abuts upwardly against the under surface of the offset portion of the lens frame at that side and restrains the temple from upward and downward movement of the temple relative to the lens frame.

3. Eyeglasses as set forth in claim 1, and in which the lens frame has a locking abutment projecting sidewise from each side edge thereof and the outer end of each temple is adapted to abut against the adjacent abutment on the lens frame when the temples are in wearing position on the lens frame whereby the temples are prevented from swinging downward relative to the lens frame.

4. Eyeglasses as set forth in claim 3, and in which the inner face of the lens frame abutment and the end face of the temple have complementary forwardly-sloping mating surfaces.

5. Eyeglasses as set forth in claim 1, and in which said rearwardly extending slot is angled downwardly from said forwardly extending slot.

6. Eyeglasses as set forth in claim 1, and in which said rearwardly extending slot is wider than said forwardly extending slot.

7. Eyeglasses as set forth in claim 1, and in which the lens frame is constructed of resilient plastic material.

References Cited

UNITED STATES PATENTS

| | | | |
|---|---|---|---|
| 854,765 | 6/1897 | Alexander | 351—41 X |
| 3,278,981 | 10/1966 | Glenn et al. | |
| 3,383,707 | 5/1968 | McNeill | 351—59 X |

FOREIGN PATENTS

| | | |
|---|---|---|
| 458,990 | 12/1936 | Great Britain. |
| 560,311 | 7/1923 | France. |
| 435,214 | 5/1948 | Italy. |
| 527,807 | 6/1955 | Italy. |

DAVID SCHONBERG, Primary Examiner

J. W. LEONARD, Assistant Examiner

U.S. Cl. X.R.

16—128; 287—21; 351—120, 121, 153